United States Patent
Rawles et al.

(10) Patent No.: US 10,317,549 B2
(45) Date of Patent: Jun. 11, 2019

(54) SYSTEMS AND METHODS FOR NON-PARAMETRIC AUTOPICKING OF SEISMIC WAVE FEATURES FROM SEISMIC DATA

(71) Applicant: Wisconsin Alumni Research Foundation, Madison, WI (US)

(72) Inventors: Christopher J. Rawles, Novato, CA (US); Clifford H. Thurber, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 721 days.

(21) Appl. No.: 14/527,315

(22) Filed: Oct. 29, 2014

(65) Prior Publication Data

US 2016/0124100 A1    May 5, 2016

(51) Int. Cl.
*G01V 1/30* (2006.01)
*G01V 1/28* (2006.01)

(52) U.S. Cl.
CPC .............. *G01V 1/307* (2013.01); *G01V 1/288* (2013.01)

(58) Field of Classification Search
CPC .......... G01V 1/30; G01V 1/364; G01V 1/282; G01V 1/301; G01V 1/28; G01V 1/288; G01V 1/307; G06F 17/5009
USPC ................. 367/7, 14, 24; 702/14, 16, 17, 18
See application file for complete search history.

(56) References Cited

U.S. PATENT DOCUMENTS

| | | | | |
|---|---|---|---|---|
| 4,516,206 A | * | 5/1985 | McEvilly | G01V 1/288 367/40 |
| 6,016,462 A | * | 1/2000 | Schneider, Jr. | G01V 1/28 702/14 |
| 6,654,692 B1 | * | 11/2003 | Neff | G01V 1/306 702/11 |
| 2003/0086335 A1 | * | 5/2003 | Naville | G01V 1/42 367/58 |
| 2004/0068375 A1 | * | 4/2004 | Cook | A61B 5/04012 702/11 |
| 2004/0114464 A1 | * | 6/2004 | Cook | G01V 1/28 367/25 |

(Continued)

OTHER PUBLICATIONS

Stefano, R., F. Aldersons, E. Kissling, P. Baccheschi, C. Chiarabba, and D. Giardini (2006). Automatic seismic phase picking and consistent observation error assessment: application to the Italian seismicity, Geo-phys. J. Int. 165, 121-134, doi 10.1111/j.1365-246X.2005.02799.x.

(Continued)

*Primary Examiner* — John E Breene
*Assistant Examiner* — Jeffrey P Aiello
(74) *Attorney, Agent, or Firm* — Quarles & Brady LLP (57) ABSTRACT

Systems and methods for automatically detecting and identifying seismic wave features in seismic data are provided. In general, the systems and methods utilize a nonparametric time series classification method to detect seismic wave features that may otherwise be difficult to automatically identify in seismic data. Instead of building a model by estimating parameters from the seismic data, the data itself is used to define a trained model. The systems and methods described here provide the ability to detect and identify seismic wave features with reasonably fast and extremely accurate results without needing to compute parameters.

16 Claims, 5 Drawing Sheets

(56) References Cited

U.S. PATENT DOCUMENTS

| | | | |
|---|---|---|---|
| 2005/0171700 A1* | 8/2005 | Dean | G01V 1/301 702/16 |
| 2010/0186950 A1* | 7/2010 | Neelamani | G01V 1/30 166/250.01 |
| 2012/0090834 A1* | 4/2012 | Imhof | G01V 1/32 166/250.01 |
| 2013/0345985 A1* | 12/2013 | Priezzhev | G01V 1/32 702/14 |
| 2015/0109885 A1* | 4/2015 | Nowak | G01V 1/50 367/25 |

OTHER PUBLICATIONS

Joswig, M., 1990. Pattern recognition for earthquake detection, Bull. seism. Soc. Am., 80(1), 170-186.

Hildyard, M.W., Nippress, S.E.J. & Rietbrock, A., 2008. Event detection and phase picking using a time-domain estimate of predominate period, Tpd, Bull. seism. Soc. Am., 98(6), 3025-3032.

Gendron P., Ebel J., and Manolakis D., 2000. Rapid joint detection and classification with wavelet bases via Bayes theorem, Bull. seism. Soc. Am., 90(3), 764-774.

Galiana-Merino J., Rosa-Herranz J., and Parolai S., 2008. Seismic P phase picking using a Kurtosis-based criterion in the stationary wavelet domain, IEEE Trans. Geosci. Remote Sens., 46(11(2)), 3815-3826.

Enescu, N., 1996. Seismic Data Processing Using Nonlinear Prediction and Neural networks, IEEE Norsig Symposium, Espoo, Finland.

Earle, P. & Shearer, P., 1994. Characterization of global seismograms using an automatic pick algorithm, Bull. seism. Soc. Am., 84(2), 366-376.

Dodge, D.A., Beroza, G.C. & Ellsworth, W.L., 1995. Foreshock sequence of the 1992 Landers, California, earthquake and its implications for earthquake nucleation, J. Geophys. Res., 100, 9865-9880.

Diehl, T., Kissling, E., Husen, S. & Aldersons, A., 2009. Consistent phase picking for regional tomography models: application to the greater Alpine region, Geophys. J. Int., 176, 542-554.

Dai, H. & MacBeth, C., 1995b. Identifying P-and S-Waves using artificial neural networks, in Extended Abstracts Book, 5th EAGE Conference and Technical Exhibition, Glasgow, Scotland, EAGE, Zeist, the Netherlands.

Dai, H. & MacBeth, C., 1997. The application of back-propagation neural-network to automatic picking seismic arrivals from single-component recordings, J. geophys. Res., 102, 15105-15115.

Chu, C. K., and J. Mendel, 1994, First break refraction event picking using fuzzy logic systems: IEEE Transactions on Fuzzy Systems, 2, No. 4, 255-266, doi:10.1109/91.324805.

Berger J., and Sax R., 2001. Seismic detectors: the state of the art, Tech. rep., VELA Seismological Center, Alexandria, VA.

Bai, C. Y., and B. L. N. Kennett (2001). Phase identification and attribute analysis of broadband seismograms at far-regional distances, J. Seism. 5, 217-231.

Bai, C. Y., and B. L. N. Kennett (2000). Automatic phase-detection and identification by full use of a single three-component broadband seismogram, Bull. Seismol. Soc. Am. 90, 187-198.

Aldersons, F. (2004). Toward three-dimensional crustal structure of the Dead Sea region from local earthquake tomography, Ph.D. Thesis, Tel Aviv University, Israel.

Der, Z.A., Shumway, R.H., 1999. Phase onset time estimation at regional distances using the CUSUM algorithm, Physics of the Earth and Planetary Interiors 113, 227-246.

Dai, H. & MacBeth, C., 1995a. Automatic picking of seismic arrivals in local earthquake data using an artificial neural network, Geophys J. Int. 120, 758-774.

\* cited by examiner

SYSTEMS AND METHODS FOR NON-PARAMETRIC AUTOPICKING OF SEISMIC WAVE FEATURES FROM SEISMIC DATA

STATEMENT REGARDING FERERALLY SPONSORED RESEARCH

This invention was made with government support under EAR-1114228 awarded by the National Science Foundation. The government has certain rights in the invention.

BACKGROUND OF THE INVENTION

The field of the invention is systems and methods for detecting seismic wave features in seismic data. More particularly, the invention relates to systems and methods for automatically identifying seismic wave features, such as S-waves, in seismic data.

Seismic events result in the release of surface waves and two types of "body" waves, referred to as "P-waves" and "S-waves." P-waves are relatively easy to detect in seismic data and this detection can be done automatically by software algorithms. S-waves travel more slowly than P-waves and are much more difficult to detect or "pick."

Detection of S-waves is desirable for locating the point of origin of earthquakes. S-wave picking can also be useful in microseismic monitoring for assessing the hydraulic fracturing ("fracking") process. For example, the locations of microseismic events are used to determine fracture network geometry, and their focal mechanisms are helpful for understanding how the fractures are stimulated. The information derived from microseismic monitoring is also helpful for reservoir simulation and assessment. Last but not least, microseismic monitoring in real-time would be useful for assessing induced seismic activity to help avoid inducing large-magnitude earthquakes.

As noted above, correct identification of phase arrival times is very important for seismic event location and identification, source mechanism analysis, and seismic tomography. Phase picking is often done manually, and identification of later arrivals, such as the S-arrival, is complicated by noise from the P-wave coda and because earlier arriving S-to-P converted waves can often be mis-identified as the S-arrival.

Today, S-wave picking is often done manually by expert analysts studying seismic data. More recently, attempts have been made at automating S-wave picking, but have yet to achieve reliable accuracy. Examples of S-wave picking methods include those using polarization analysis (Cichowicz, 1993; Reading et al., 2001); neural networks or trees (Wang and Teng, 1997; Gentili and Nichelini, 2006); auto-regressive modeling (Takanami and Kitigama, 1993; Leonard and Kennett, 1999; Kuperkoch et al., 2012); higher-order statistics, especially kurtosis (Savvaidis et al., 2002; Baillard et al., 2014); wavelet analysis (Anant and Dowla, 1997); and combinations of techniques (Patane et al., 2003; Sleeman and van Eck, 2003; Diehl et al., 2009).

Currently available phase detection methods almost exclusively use a parameter-based approach, in which a parameter such as kurtosis or Akaike information criteria ("AIC") is estimated and relied upon to build a model for determining whether a given window represents a phase arrival. The drawbacks with these approaches include error sources propagating from the parameter estimation to the detection task.

Thus, there remains a need to provide a system and method for identifying seismic features, such as the arrival of S-waves, in seismic data that do not require computing intermediate parameters to perform the detection task.

SUMMARY OF THE INVENTION

The present invention overcomes the aforementioned drawbacks by providing systems and methods for detecting and identifying a seismic wave feature in seismic data. A set of training data that represents a seismic wave feature of interest is provided. The training data may be seismic data or a numerical model of the seismic wave feature of interest. Seismic data that includes seismic traces is then provided, which may include acquiring the seismic data. In some instances, the seismic data can be acquired and processed in real-time. The seismic data is scaled based on information contained in the seismic data. A similarity score between the provided seismic data and the provided training data is computed, and based on that similarity score, a portion of the provided seismic data is identified as containing a seismic wave feature of interest. The seismic wave feature of interest is then selected as occurring at a selected time point in the identified portion of the seismic data.

The foregoing and other aspects and advantages of the invention will appear from the following description. In the description, reference is made to the accompanying drawings that form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION OF THE INVENTION

Described here are systems and methods for automatically detecting and identifying seismic wave features in seismic data. Seismic wave features that can be detected and identified include P-waves, S-waves, P-wave to S-wave conversions, surface waves, and so on.

In general, the systems and methods utilize a nonparametric time series classification method to detect seismic wave features that may otherwise be difficult to automatically identify in seismic data. Instead of building a model by estimating parameters from the seismic data, the data are used to define a model. This approach runs contrary to previous methods for detecting seismic wave features, which relied on computing parameters from the seismic data and then basing the feature detection on those parameters. As an example, some machine learning methods, such as neural networks and neural trees, have been used for phase identification, but the majority of these previous methods are trained on parameters, such as AR-model coefficients or short-term average/long-term average ("STA/LTA") values, instead of on the raw data. These previous methods have limited reliability because detection is based on parameters, whose computation could be affected by error sources, rather than the raw data. The systems and methods of the present invention, however, provide the ability to detect and identify seismic wave features with reasonably fast and extremely accurate results without needing to compute parameters.

In some embodiments, to address the limitations of previous seismic wave feature detection techniques, the systems and methods of the present invention are based on computing the similarity of input signals to a reference, or training, data set containing the seismic wave features of interest. Potential seismic wave features of interest, which may include S-wave arrivals, are identified based on their similarity to a set of training data that includes positive and negative reference sets. As an example, the positive set contains examples of analyst-identified seismic wave features and the negative set contains noise, which may include P-wave or S-wave coda.

Figure 1:
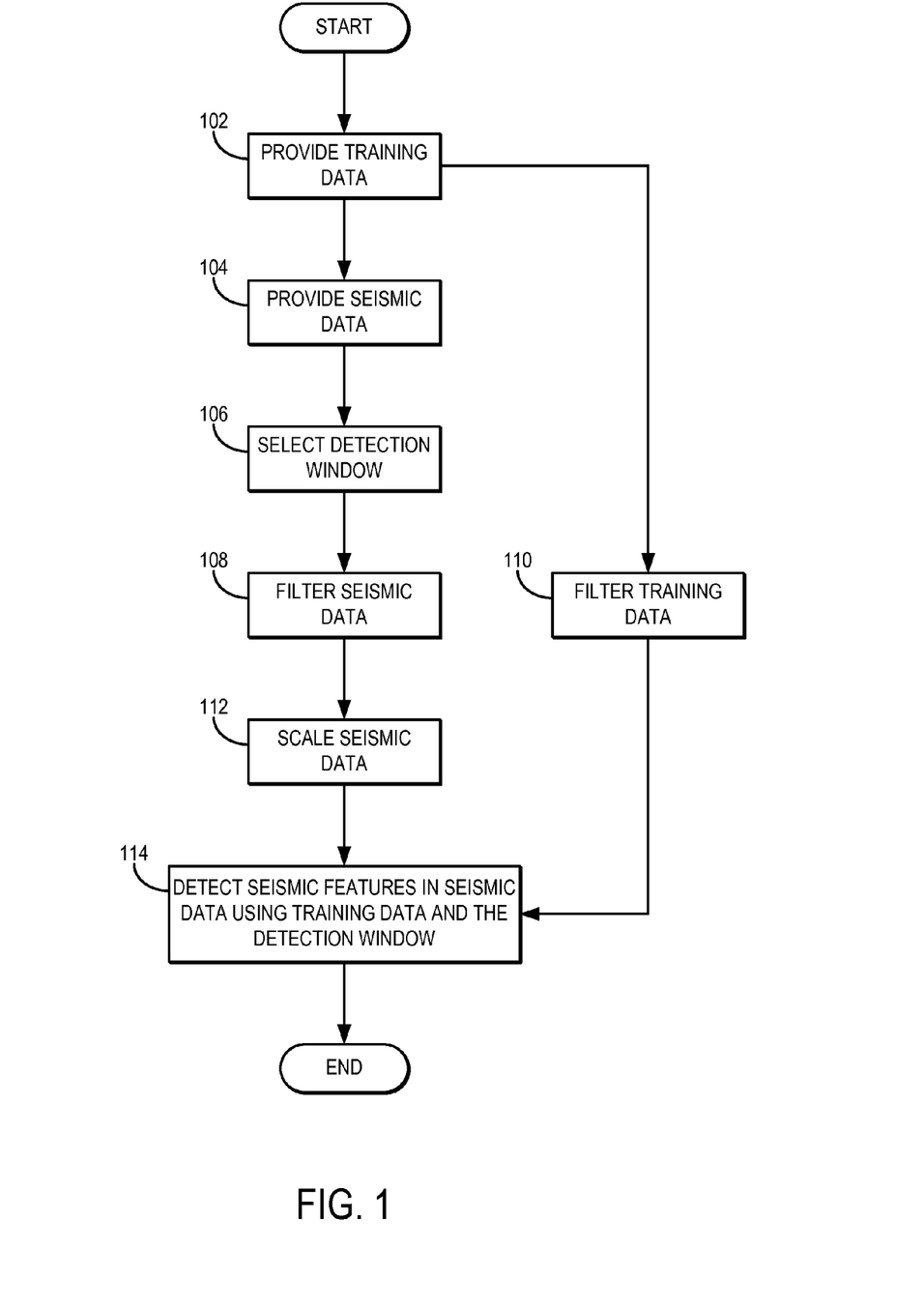
FIG. 1 is a flowchart setting forth the steps of an example method for detecting a seismic wave feature of interest in seismic data using appropriately selected training data.

Referring now to FIG. 1, a flowchart is illustrated as setting forth the steps of an example method for automatically detecting and identifying a seismic wave feature in seismic data. A seismic wave feature may include a P-wave, and S-wave, a P-wave to S-wave conversion, a surface wave, and so on.

The method includes providing training data, as indicated at step 102. In some embodiments, the training data may include seismic data containing at least one seismic wave feature that is similar to the seismic wave feature of interest to be detected and identified in the acquired data. For instance, if the detection task is to identify S-waves in seismic data, then the training data will include at least one S-wave.

In general, the training data includes a positive reference and a negative reference. The positive reference can be a portion of seismic data that has been identified as corresponding to the seismic wave feature of interest. For instance, the positive reference can include a portion of seismic data manually identified as containing an S-wave. For example, the positive reference can include horizontal traces identified as containing the seismic wave feature of interest. The negative reference can be a portion of seismic data that does not contain the seismic wave feature of interest. As one example, the negative reference can be selected as a noisy portion of the seismic data occurring after the positive reference. For instance, the negative reference can be selected as S-wave coda windows extracted from the positive reference. As another example, the negative reference can be selected as a noisy portion of the seismic data occurring before the positive reference.

The training data does not need to be geographically or geologically specific. That is, training data based on seismic data acquired from one geographic or geologic region can be used to detect seismic wave features in seismic data acquired from a completely different geographic or geologic region.

In some embodiments, the training data can include a simple model of the desired seismic wave feature. As one example, the training data can comprise a step function that models the initiation of an S-wave.

As one specific, and non-limiting, example, the training data can be established as follows. For this example, two different datasets containing S-wave picks from two different analysts were used as the basis for two different training data sets. The first data was acquired from the Parkfield region in central California, and the second was acquired from the Alpine Fault region on the South Island of New Zealand. The Alpine Fault dataset includes 209 analyst picks from over 30 different broadband and short period stations along approximately 50 km of the Alpine Fault from the WIZARD array operated in 2012-2014. The Parkfield dataset includes 721 analyst picks from over 50 stations of the PASO array along the San Andreas Fault operated in 2001-2002.

These training data sets were then processed, as will be described in more detail below. In this example, the horizontal traces for each station-event pair were band-pass filtered between 3 Hz and 30 Hz and cut 0.5 seconds after the known P-wave arrival. In addition, all signals were down-sampled to the minimum sampling rate of all signals. Next, an expected S-wave arrival was calculated assuming a P-wave speed to S-wave speed ($v_P/v_S$) ratio of 1.7, and by defining an S-wave arrival region as ±2 seconds around the expected S-wave arrival. Signals for which the analyst S-wave pick fell outside this 4 second region were removed from the analysis, considering them to be inconsistent and therefore unreliable.

Figure 2:
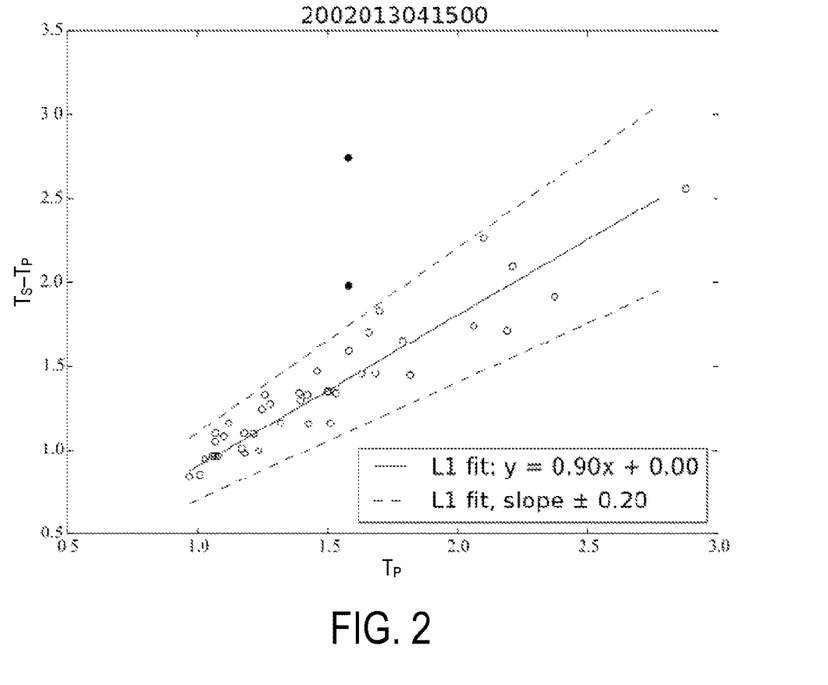
FIG. 2 is an example of a Wadati diagram and $L_1$ fit for an example training data set, which can be used to improve the accuracy of the training data by identifying outliers to be removed from the training data.

In addition, erroneous analyst picks can be identified and removed using a Wadati diagram, excluding outliers from a least absolute deviation ($L_1$) fit. An example of such a Wadati diagram is illustrated in FIG. 2, which shows a Wadati diagram and $L_1$ fit for Parkfield event 2002009235200. Analyst pick outliers (solid black dots) are identified as erroneous picks and removed from the analysis if points fall outside of lines with slope +/−0.2 that of the $L_1$ fit. Using these quality control methods, analyst picks can be reasonably removed from the provided training data sets to improve their accuracy.

Referring again to FIG. 1, after the training data have been provided, seismic data are acquired or otherwise provided, as indicated at step 104. In some embodiments, the seismic data can be acquired and processed in real-time.

A detection window size is then selected, as indicated at step 106. This detection window size defines a detection window that will be used for automatically detecting and identifying the seismic wave feature of interest in provided seismic data. By way of example, the detection window size can be selected based on known temporal characteristic of the seismic wave feature of interest. For instance, if the seismic wave feature of interest is an S-wave arrival, then the window size can be selected based on the known temporal characteristics of S-wave arrivals. As one example, the window length can be selected as 0.67 seconds. It will be appreciated that other window sizes can be suitably selected depending at least in part on the seismic wave feature of interest.

The seismic data are then filtered, as indicated at step 108. As an example, the seismic data are filtered using a bandpass filter that is designed to remove parts of the seismic data that are not important for the detection task. When the training data includes seismic data, the seismic data are preferably also filtered, as indicated at step 110, and using the same filter used on the acquired seismic data, as described above. By using the same filter, the frequency content of the seismic data and the training data will be equalized, which can improve the detection efficiency of the seismic wave feature picker.

As another pre-processing step, the seismic data are scaled, as indicated at step 112. In general, the seismic data can be scaled using a scaling factor, which in some embodiments is determined from the seismic data. As one example, the scaling factor can be determined as the scaling factor that normalizes a selected portion of the seismic data. For instance, a portion of the seismic data that is thought to contain the seismic wave feature of interest can be selected and normalized, and the scaling factor that normalizes that portion of the seismic data can be used to scale the seismic data as a whole.

Using the training data and the selected detection window, the scaled seismic data are processed to detect and identify seismic wave features, as indicated at step 114. In general, the seismic wave feature of interest can be detected and identified using a sliding window analysis, whereby seismic data within the selected detection window is compared with the training data.

In some embodiments, a k-nearest neighbors based approach is used to detect and identify seismic wave features with the appropriately prepared training data. As one example, similarity between the seismic data and the training data can be computed. In some embodiments, similarity can be defined as the Euclidean distance between the scaled absolute values of the amplitudes of the observed signal and a given reference example. It will be appreciated by those skilled in the art, however, that other distance or similarity metrics can also be used.

By way of example, a seismic wave feature of interest can be detected and identified as follows. A single pass is done through the band-passed, scaled seismic data to produce a seismic wave feature score function that is defined, for each window, as the ratio of the sum of similarity to positive reference examples over the sum of similarity to negative reference examples. The seismic wave feature of interest is chosen as the center position of the window that maximizes this score function.

Using an S-wave arrival as the seismic wave feature of interest, S-wave onsets can be identified in seismic data by taking successive windows of a given horizontal trace and computing a similarity metric to the set of positive and negative reference set examples. For both horizontal traces in a given station-event combination, an S-wave score function is computed for the two traces at each time step, and these scores are multiplied together to produce a final score. The S-wave arrival is chosen at the center of the window corresponding to the maximum score.

In this example, each horizontal trace is processed independently and the following analysis is applied to each un-rotated horizontal trace. A moving-window procedure is performed, using the previously selected window size. For each time window, a vote, V, is calculated by comparing the observed data, s, to the reference trace, r, in the training data:

$$V(r,s) = e^{-\gamma d(r,s)} \quad (1);$$

where $\gamma$ is a weighting parameter and $d(r,s)$ is a distance metric between the reference signal and the observed data. As one example, the distance metric can be the square of the Euclidean distance, $$d(r,s) = \sum_{i=1}^{} (r_i - s_i)^2. \quad (2)$$

Figure 3:
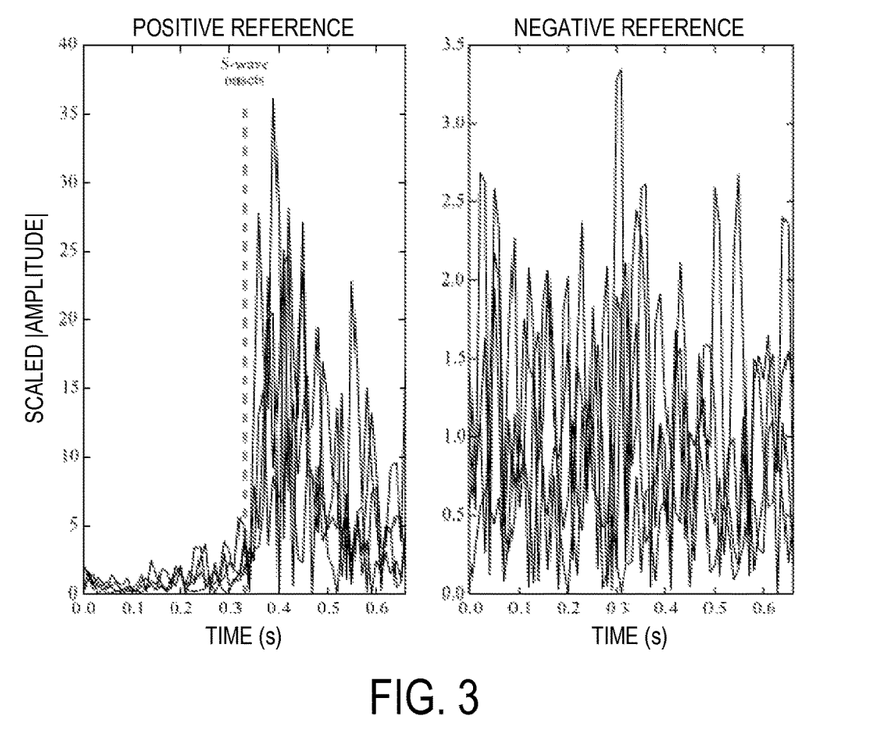
FIG. 3 is an example of positive and negative reference data sets, which include four horizontal component records containing S-wave analyst picks and four horizontal component records containing noise, and in which each window is scaled using the absolute amplitude of the data in the window and divided by the mean of the second half of the window.

Each vote represents the degree of similarity between the observed data and a given reference signal in the training data. As described above, the training data, R, contains equal numbers of positive and negative reference signals. An example of a positive reference set and a negative reference set is illustrated in FIG. 3. The votes are aggregated for the positive and negative comparisons, and a score, R(s), is calculated for each window by taking the ratio of the positive to negative vote sums:

$$R(s) = \frac{\sum_{r \in R_+} V(r,s)}{\sum_{r \in R_-} V(r,s)}. \quad (3)$$

Figure 4:
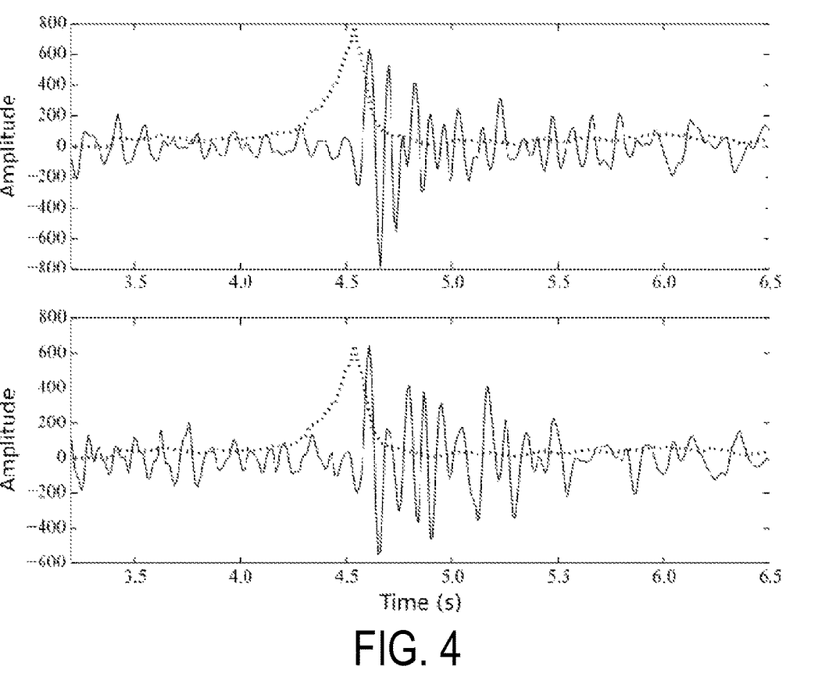
FIG. 4 is an example of two horizontal traces (solid lines) and their associated $R_{pair}$ score curve (dotted line)

FIG. 4 shows an example of two horizontal traces and their associated R-curves. For a given station-event pair, two scores $R_{H1}$ and $R_{H2}$ are computed for the two horizontal traces, and a single score, $R_{pair}$, is computed by combining the two horizontal R-score values, which can be accomplished using multiplication or addition as follows:

$$R_{pair}(s) = R_{H1}(s) \cdot R_{H2}(s) \quad (4);$$

or, $$R_{pair}(s) = R_{H1}(s) + R_{H2}(s) \quad (5).$$

The S-wave window is then determined as the window, $s_{max}$, that maximizes $R_{pair}$, $$s_{max} = \max_s (R_{pair}(s)). \quad (6)$$

Finally, the S-wave pick is selected as the time of the center of the $s_{max}$ window.

Figure 5:
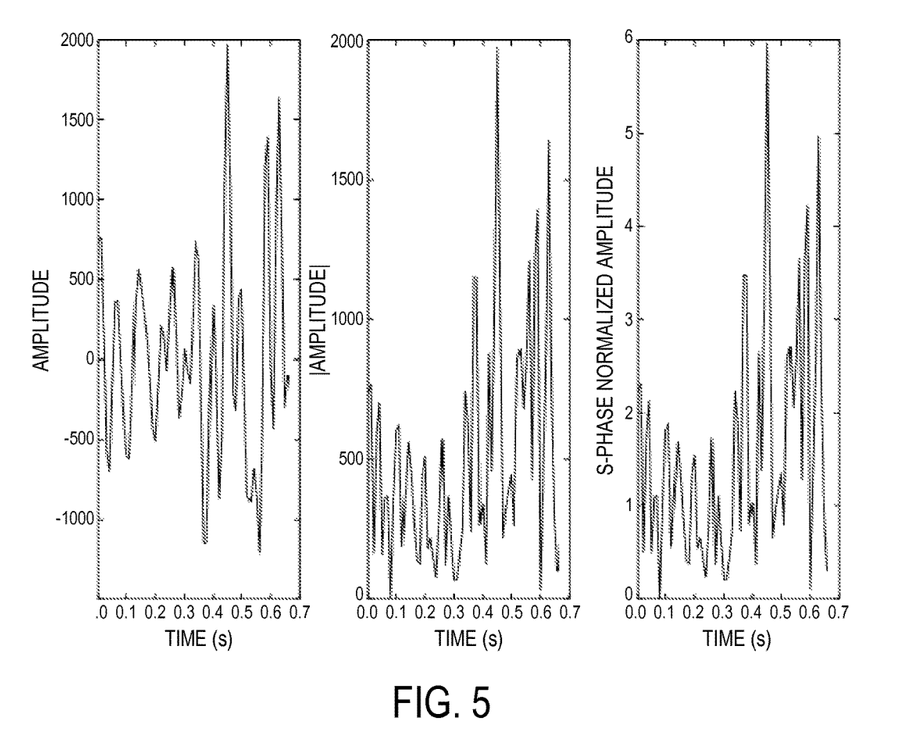
FIG. 5 is an example illustrating a re-scaling scheme used in some embodiments of the present invention, whereby an un-scaled example of an S-wave arrival at 0.33 seconds (left) is rescaled by computing the absolute value of the data's amplitude (middle) and then dividing that absolute amplitude by the mean of the second half of the S-wave portion of the signal (0.34 seconds to 0.67 seconds) (right)

As one example implementation of the methods described above, the weighting parameter, $\gamma$, can be selected as 0.0001, the moving-window length can be selected as 0.67 seconds, and the data can be band-pass filtered between 3 Hz and 30 Hz. Positive reference waveforms were created using the portion of the training data 0.33 seconds before and after the analyst S-wave pick, whereas negative reference waveforms were created by cutting a 0.67 second window several seconds after the S-wave analyst pick. Both the positive and negative reference waveforms were scaled by taking the absolute value of the amplitude and dividing by the mean amplitude of the second half of the 0.67 second window of the positive examples. An example of seismic data scaled in this manner is illustrated in FIG. 5.

A quality rating that includes two classes can be used to rate the quality of a seismic wave feature pick. For example, a class 1 can be defined based on a signal-to-noise ratio ("SNR") greater than 1, and a class 0 can be defined based on an SNR greater than 10. SNR can be calculated by selecting noise as the RMS value from the first half of the window before the S-wave onset and selecting the signal as the RMS value in the second half of the window after the S-wave onset.

In some embodiments, the detected and identified seismic wave features can also be processed to remove erroneous picks, similar to those methods that can be applied to improve the accuracy of the training data. For instance, a Wadati diagram and $L_1$ fit, such as those illustrated in FIG. 2, can be used to this end. As one example, after automatic S-wave picks are identified, a Wadati diagram can be constructed for each event using automatic S-wave picks and analyst P-wave picks. Outliers in this Wadati diagram can then be marked as incorrect picks and are therefore not used.

Thus, a simple, fast, and accurate method for automatically identifying seismic wave features, such as S-wave onsets, in seismic data has been provided. In some embodiments, a k-nearest neighbor based technique is applied to band-passed horizontal seismograms. The method identifies potential S-wave onsets by comparing the similarity of a given window to a set of known S-wave onsets and to a set of examples containing noise. An S-wave onset score function is calculated using the ratio of similarity to the S-wave examples divided by the similarity to the noise examples. The method only needs to use the horizontal component of seismograms, although other components can also be included in the analysis, and needs only one pass through the band-passed data with a fixed window size.

The method has few parameters to tune, and the method has been found to be invariant to the training set. It is contemplated that the method requires only two reference picks to achieve an acceptable classification rate. The success of the method using training sets from different geographic locations suggests that, at least in some cases, the method can work as an out-of-the-box auto-picker using a provided training set.

Figure 6:
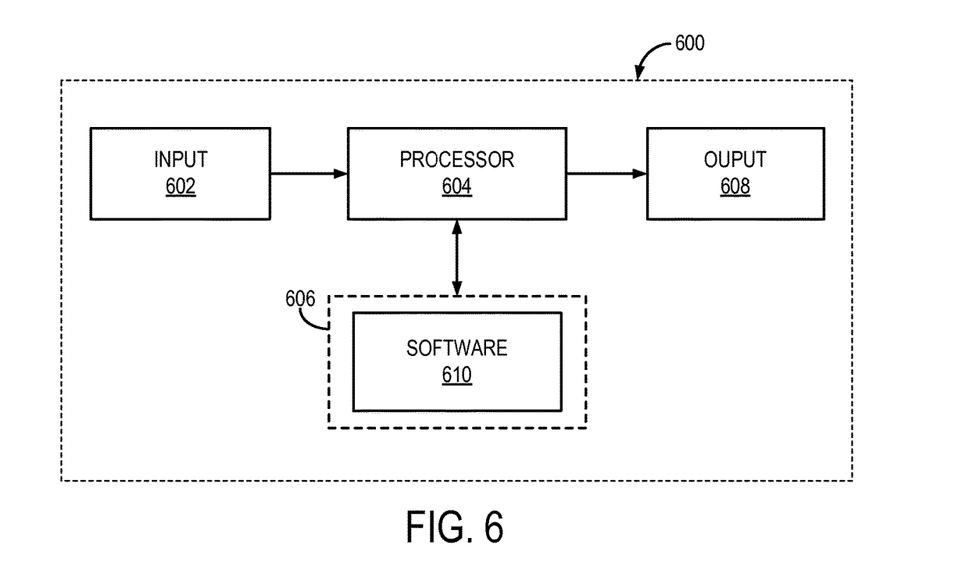
FIG. 6 is a block diagram of an example computer system that can implement some embodiments of the present invention.

Referring now to FIG. 6, a block diagram is illustrated of an example computer system 600 that can be used for detecting and identifying seismic wave features in seismic data in accordance with some embodiments of the present invention. The system 600 generally may include an input 602, at least one processor 604, a memory 606, and an output 608. The system 600 may be, for example, a workstation, a notebook computer, a personal digital assistant ("PDA"), a multimedia device, a network server, a mainframe, or any other general-purpose or application-specific computing device. The computer system 600 may operate autonomously or semi-autonomously, or may read executable software instructions from a computer-readable medium (such as a hard drive, a CD-ROM, flash memory, and the like), or may receive instructions from a user, or any another source logically connected to a computer or device, such as another networked computer or server, via the input 602.

The input 602 may take any shape or form, as desired, for operation of the computer system 600, including the ability for selecting, entering, or otherwise specifying parameters consistent with operating the computer system 600. In some instances, the input 602 may be designed to receive training data that represents a seismic wave feature of interest and seismic data.

Among the processing tasks for operating the computer system 600, the at least one processor 604 may be configured to perform the method described above with respect to FIG. 1.

The memory 606 may contain software 608, and may be configured for storage and retrieval of processed information and data to be processed by the processor 604. In some aspects, the software 608 may contain instructions directed to performing the method described above with respect to FIG. 1.

The present invention has been described in terms of one or more preferred embodiments, and it should be appreciated that many equivalents, alternatives, variations, and modifications, aside from those expressly stated, are possible and within the scope of the invention.

The invention claimed is:

1. A computer system for detecting and identifying a seismic wave feature in seismic data using a non-parametric time series classification model, the computer system comprising:
   a memory having instructions stored therein;
   a processor configured to access the instructions stored in the memory and execute the instructions to cause the computer system to:
   (a) store a set of training seismic data comprising a positive reference containing an S wave and a negative reference in the memory;
   (b) generate a detection window having a detection window size corresponding to a temporal characteristic of the S-wave and store the detection window in the memory;
   (c) provide seismic data based on a seismic event that includes seismic traces;
   (d) scale the seismic data based on information contained in the seismic data;
   (e) perform a sliding window analysis by moving the detection window through a plurality of different time points in the seismic data and computing a similarity score for each of the plurality of different time points, wherein computing the similarity score includes:
   computing a positive reference similarity score between the seismic data and the positive reference;
   computing a negative reference similarity score between the seismic data and the negative reference; and
   computing the similarity score based on a ratio between the positive reference similarity score and the negative reference similarity score;
   (f) select at least one of the similarity scores from the plurality of different points in the seismic data as corresponding to the S-wave; and
   (g) generate a report that includes a location or identification of the seismic event based on the S-wave.

2. The computer system as recited in claim 1, wherein step (d) includes computing an absolute value of an amplitude of the seismic data and scaling the seismic data based on the computed absolute value.

3. The computer system as recited in claim 2, wherein step (d) includes computing an average amplitude over a portion of the seismic data and scaling the seismic data by dividing the computed absolute value by the computed average.

4. The computer system as recited in claim 1, wherein the negative reference is defined as a portion of the training seismic data that does not include an S-wave.

5. The computer system as recited in claim 1, wherein step (e) includes computing a distance metric between the training seismic data and the seismic data.

6. The computer system as recited in claim 5, wherein the distance metric is a squared Euclidean distance.

7. The computer system as recited in claim 1, wherein selecting the portion of the provided seismic data as containing the S-wave in step (f) includes determining the time point at which the detection window is associated with a maximum similarity score.

8. The computer system as recited in claim 1, wherein computing the similarity score includes computing a vote for each detection window, wherein the vote is based in part on a distance metric between the training seismic data and the seismic data.

9. The computer system as recited in claim 8, wherein the vote includes weighting the distance metric by a weighting value.

10. The computer system as recited in claim 1, further comprising filtering the provided seismic data using a band-pass filter to remove selected frequency components from the seismic data.

11. The computer system as recited in claim 10, further comprising filtering the provided training seismic data using the band-pass filter to also remove the selected frequency components from the training seismic data.

12. The computer system as recited in claim 1, wherein the provided training seismic data includes a numerical model that represents the S-wave.

13. The computer system as recited in claim 1, wherein the positive reference in the provided set of training seismic data further includes at least one identified P-wave, P wave to S wave conversion, or surface wave, and wherein step (d) further includes processing the seismic data and the training seismic data to identify a portion of the seismic data as containing a P-wave, P wave to S wave conversion, or surface wave based on a computed similarity score between the seismic data and the training seismic data.

14. The computer system as recited in claim 1, further comprising determining a quality of the S-wave based on a Wadati diagram.

15. The computer system as recited in claim 7, wherein the S-wave is selected as corresponding to a center position of the detection window having the maximum similarity score.

16. The computer system as recited in claim 1, wherein the report that includes the location or identification of the seismic event based on the S-wave is generated in real-time.

* * * * *